United States Patent
Rupp

(10) Patent No.: US 10,255,128 B2
(45) Date of Patent: Apr. 9, 2019

(54) ROOT CAUSE CANDIDATE DETERMINATION IN MULTIPLE PROCESS SYSTEMS

(71) Applicant: Red Hat, Inc., Raleigh, NC (US)

(72) Inventor: Heiko W. Rupp, Stuttgart (DE)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 15/239,157

(22) Filed: Aug. 17, 2016

(65) Prior Publication Data
US 2018/0052728 A1 Feb. 22, 2018

(51) Int. Cl.
G06F 11/00 (2006.01)
G06F 11/07 (2006.01)

(52) U.S. Cl.
CPC ........ G06F 11/079 (2013.01); G06F 11/0775 (2013.01)

(58) Field of Classification Search
CPC .................................................... G06F 11/079
See application file for complete search history.

(56) References Cited

U.S. PATENT DOCUMENTS

| | | | |
|---|---|---|---|
| 7,096,459 B2 | 8/2006 | Keller et al. | |
| 7,818,418 B2 | 10/2010 | Bansal et al. | |
| 7,992,040 B2 | 8/2011 | Agarwal et al. | |
| 8,001,527 B1 | 8/2011 | Qureshi et al. | |
| 8,161,058 B2 | 4/2012 | Agarwal et al. | |
| 8,321,430 B2 * | 11/2012 | Zvi | G06F 17/30368 707/754 |
| 9,092,561 B2 | 7/2015 | Miao et al. | |
| 9,122,602 B1 | 9/2015 | Jewell et al. | |
| 2008/0155335 A1 * | 6/2008 | Klein | G06K 9/622 714/37 |
| 2009/0327195 A1 * | 12/2009 | Iscen | G06N 5/042 706/47 |
| 2010/0023731 A1 * | 1/2010 | Ito | G06F 8/456 712/216 |
| 2011/0083123 A1 | 4/2011 | Lou et al. | |

(Continued)

OTHER PUBLICATIONS

Kishore, G.D.K et al., "Automated Anomaly and Root Cause Detection in Distributed Systems," International Journal of Engineering Trends and Technology, vol. 3, No. 1, Feb. 2012, pp. 47-52.

(Continued)

*Primary Examiner* — Christopher S McCarthy
(74) *Attorney, Agent, or Firm* — Withrow & Terranova, PLLC

(57) ABSTRACT

Root cause determination in multiple process systems is disclosed. It is determined that a first process encountered a problem at a first point in time. A directed graph that represents each process of a plurality of processes, including the first process, as a corresponding vertex of a plurality of vertices in the directed graph is accessed. A path through the directed graph from a start vertex to an end vertex is determined to identify a subset of processes that correspond to the vertices in the path. Corresponding runtime metric values are accessed to determine whether a runtime metric value is a non-desired value for at least one of the processes in the subset of processes. A process in the subset of processes is identified as a root cause candidate of the problem encountered by the first process.

16 Claims, 5 Drawing Sheets

(56) References Cited

U.S. PATENT DOCUMENTS

| | | | |
|---|---|---|---|
| 2015/0033086 A1* | 1/2015 | Sasturkar | G06F 11/0709 714/57 |
| 2015/0172412 A1* | 6/2015 | Escriva | G06F 17/30091 709/202 |
| 2015/0195171 A1* | 7/2015 | Mermoud | H04L 43/0864 370/253 |
| 2015/0288557 A1* | 10/2015 | Gates | G06F 11/0709 714/37 |
| 2016/0063282 A1* | 3/2016 | Shani | G06F 8/60 717/121 |
| 2017/0068747 A1* | 3/2017 | Qi | G06F 11/3006 |
| 2017/0075744 A1* | 3/2017 | Deshpande | G06F 11/079 |
| 2017/0242773 A1* | 8/2017 | Cirne | G06F 11/0706 |

OTHER PUBLICATIONS

Mirgorodskiy, Alexander Vladimirovich, "Automated Problem Diagnosis in Distributed Systems," Dissertation, University of Wisconsin—Madison, 2006, 221 pages.

Zhou, Wenchao, "Fault Management in Distributed Systems," Technical Reports (CIS), Paper 914, Jan. 5, 2010, 27 pages.

Author Unknown, "Root cause analysis," Wikipedia, last modified on Aug. 6, 2016, 3 pages, https://en.wikipedia.org/wiki/Root_cause_analysis.

\* cited by examiner

ROOT CAUSE CANDIDATE DETERMINATION IN MULTIPLE PROCESS SYSTEMS

TECHNICAL FIELD

The examples relate generally to multiple process systems, and in particular to determining a root cause candidate of a problem in a multiple process system.

BACKGROUND

Complex data processing environments often involve multiple processes that are interrelated with one another. Often a failure of, or processing deficiency in, a first process may be the result of a processing deficiency in, or an action of, a second process with which the first process is directly or indirectly interrelated. Identifying the downstream, or root cause, of a problem encountered by a process can help focus efforts at preventing the problem from recurring.

SUMMARY

The examples identify one or more processes in a multiple process system as root cause candidates of a problem encountered by another process in the multiple process system. Generally, the examples access a directed graph that identifies forward and reverse dependencies between a plurality of interrelated processes. Based on such dependencies, and on data that identifies runtime metric values of the processes, the examples identify one or more of the processes as root cause candidates of the problem.

In one example, a method for identifying a process as a root cause candidate of a problem is provided. The method includes determining that a first process encountered a problem at a first point in time. The method further includes accessing a directed graph that represents each process of a plurality of processes, including the first process, as a corresponding vertex of a plurality of vertices in the directed graph. Each respective vertex is connected to at least one other vertex by an edge identifying a forward dependency or a reverse dependency between the respective vertex and the at least one other vertex based on corresponding dependencies between the processes that correspond to the respective vertex and the at least one other vertex. The method further includes determining a path through the directed graph from a start vertex to an end vertex to identify a subset of processes that correspond to vertices in the path. The method further includes accessing corresponding runtime metric values to determine whether a runtime metric value is a non-desired value for at least one of the processes in the subset of processes. The method further includes identifying a process in the subset of processes as a root cause candidate of the problem encountered by the first process.

In another example, a computing device is provided. The computing device includes a memory and a processor device coupled to the memory. The processor device is to determine that a first process encountered a problem at a first point in time. The processor device is further to access a directed graph that represents each process of a plurality of processes, including the first process, as a corresponding vertex of a plurality of vertices in the directed graph. Each respective vertex is connected to at least one other vertex by an edge identifying a forward dependency or a reverse dependency between the respective vertex and the at least one other vertex based on corresponding dependencies between the processes that correspond to the respective vertex and the at least one other vertex. The processor device is further to determine a path through the directed graph from a start vertex to an end vertex to identify a subset of processes that correspond to vertices in the path. The processor device is further to access corresponding runtime metric values to determine whether a runtime metric value is a non-desired value for at least one of the processes in the subset of processes. The processor device is further to identify a process in the subset of processes as a root cause candidate of the problem encountered by the first process.

In another example, a computer program product for identifying a process as a root cause candidate of a problem is provided. The computer program product is stored on a non-transitory computer-readable storage medium and includes instructions to cause a processor device to determine that a first process encountered a problem at a first point in time. The instructions are further to cause the processor device to access a directed graph that represents each process of a plurality of processes, including the first process, as a corresponding vertex of a plurality of vertices in the directed graph. Each respective vertex is connected to at least one other vertex by an edge identifying a forward dependency or a reverse dependency between the respective vertex and the at least one other vertex based on corresponding dependencies between the processes that correspond to the respective vertex and the at least one other vertex. The instructions are further to cause the processor device to determine a path through the directed graph from a start vertex to an end vertex to identify a subset of processes that correspond to vertices in the path. The instructions are further to cause the processor device to access corresponding runtime metric values to determine whether a runtime metric value is a non-desired value for at least one of the processes in the subset of processes. The instructions are further to cause the processor device to identify a process in the subset of processes as a root cause candidate of the problem encountered by the first process.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first process" and "second process," and does not imply a priority, a type, an importance, or other attribute, unless otherwise stated herein. As used herein and in the claims, the articles "a" and "an" in reference to an element refers to "one or more" of the element unless otherwise explicitly specified.

Complex data processing environments, such as distributed systems, often involve multiple processes that are interrelated with one another. Often a failure of, or processing deficiency in, a first process may be the result of a processing deficiency in, or an action of, a second process with which the first process is directly or indirectly interrelated. Identifying the downstream, or root cause, of a problem encountered by a process can help focus efforts to prevent the problem from recurring. However, determining the root cause of a problem in such an environment can be difficult.

The examples identify one or more processes in a multiple process system as root cause candidates of a problem encountered by another process in the multiple process system. Generally, the examples access a directed graph that identifies forward and reverse dependencies between a plurality of interrelated processes. Based on such dependencies, and on data that identifies runtime metric values of the processes, the examples identify one or more of the processes as root cause candidates of the problem.

Figure 1:
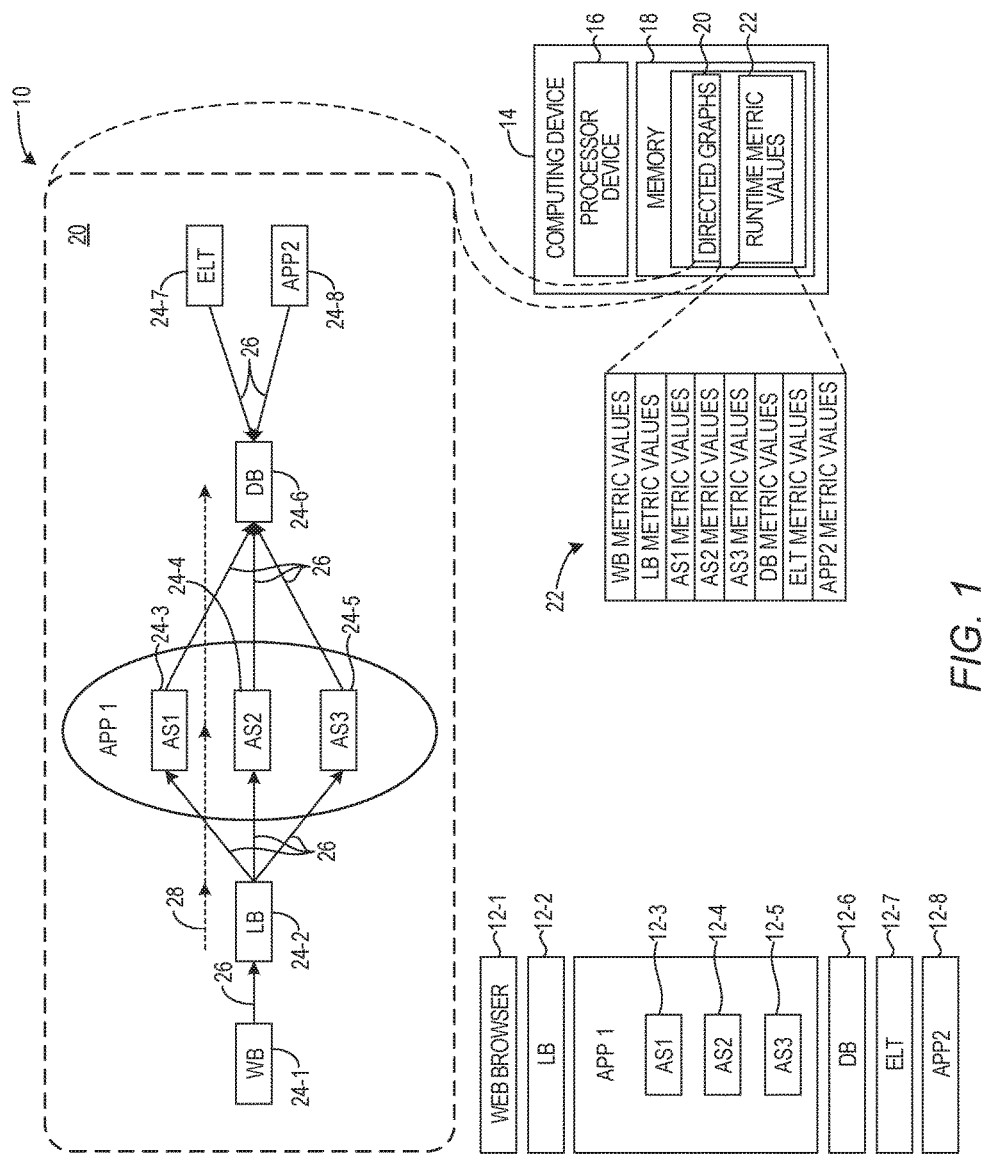
FIG. 1 is a block diagram of an environment in which examples may be practiced.

FIG. 1 is a block diagram of an environment 10 in which examples may be practiced. A plurality of processes 12-1-12-8 (generally, processes 12) are all part of a distributed system. The phrase "process" as used herein refers to a digitally implemented function which could comprise hardware, software, or a combination of both. In some examples, one or more of the processes may be specialized apparatuses comprising special-purpose circuitry. In other examples, one or more of the processes may be computer program products comprising executable instructions instantiated in a memory of a computing device and executed in conjunction with a processing device of the computing device. In such latter example, the executable instructions cause the processor device to function in a manner that is different from how the processor device would function in the absence of the executable instructions.

The processes 12 may be executed on separate hardware devices or may all be executing on the same hardware device. A computing device 14 includes a processor device 16 and a memory 18. The memory 18 includes a directed graph 20. The directed graph 20 identifies each of the processes 12 as being interrelated with one another, and also identifies forward and reverse dependencies between the processes 12. The computing device 14 also includes, or has access to, runtime metric values 22 that quantify runtime metrics of the processes 12. The computing device 14 may also include a display device on which information may be presented.

Figure 2:
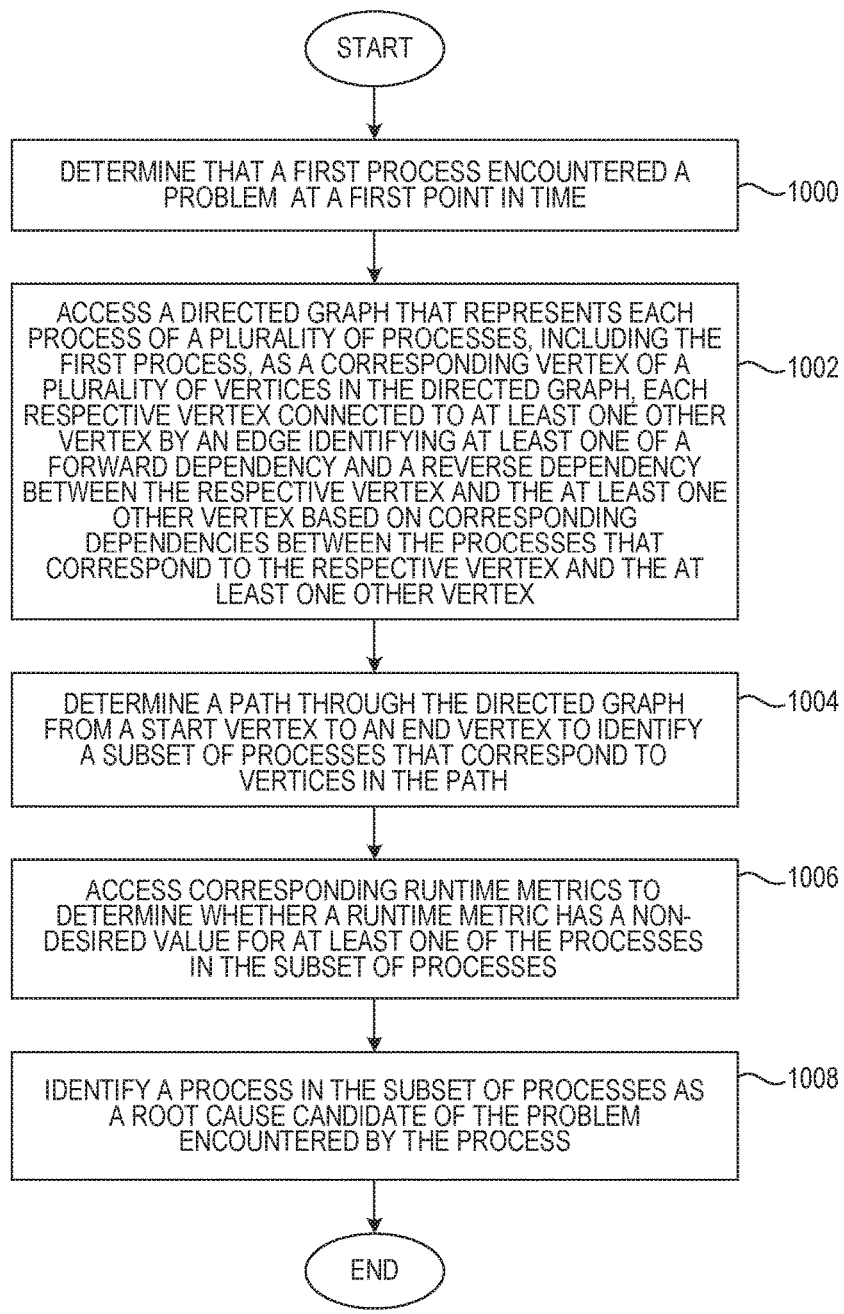
FIG. 2 is flowchart of a method for identifying a process as a root cause candidate of a problem according to one example.

FIG. 2 is flowchart of a method for identifying a process 12 as a root cause candidate of a problem according to one example. FIG. 2 will be discussed in conjunction with FIG. 1. Initially, it is determined that a process 12 encountered a problem at a first point in time (FIG. 2, block 1000). This determination can be made in any number of ways. In one example, the computing device 14 may access information that identifies events associated with the process 12, such as an unexpected termination of a process 12, to identify a problem. In another example, user input may be received, such as from an operator, that identifies a process 12 as having encountered a problem. For example, the operator may be informed by a user 25 of a process 12 that the process 12 is not functioning, or is functioning too slowly. In response, the operator may enter a command to the computing device 14 that identifies the particular process 12 as having encountered a problem.

For purposes of illustration assume that the process 12-1 has been determined to have a problem. The computing device 14 accesses the directed graph 20 that represents each process 12-1-12-8 as a corresponding vertex 24-1-24-8 (generally, vertices 24). Each respective vertex 24 is connected to at least one other vertex 24 by an edge 26 that identifies a forward dependency or a reverse dependency between the respective vertex 24 and the at least one other vertex 24 based on corresponding dependencies between the processes 12 that correspond to the respective vertex 24 and the at least one other vertex 24 (FIG. 2, block 1002). The computing device 14 determines a path 28 through the directed graph 20 from a start vertex 24-2 to an end vertex 24-6 to identify a subset of processes 12 that correspond to vertices 24 in the path (FIG. 2, block 1004). The computing device 14 accesses corresponding runtime metric values 22 to determine whether a runtime metric value 22 is a non-desired value for at least one of the processes 12 in the subset of processes 12 (FIG. 2, block 1006). The computing device 14 identifies a process 12 in the subset of processes 12 as a root cause candidate of the problem encountered by the first process 12-1 (FIG. 2, block 1008).

Figure 3:
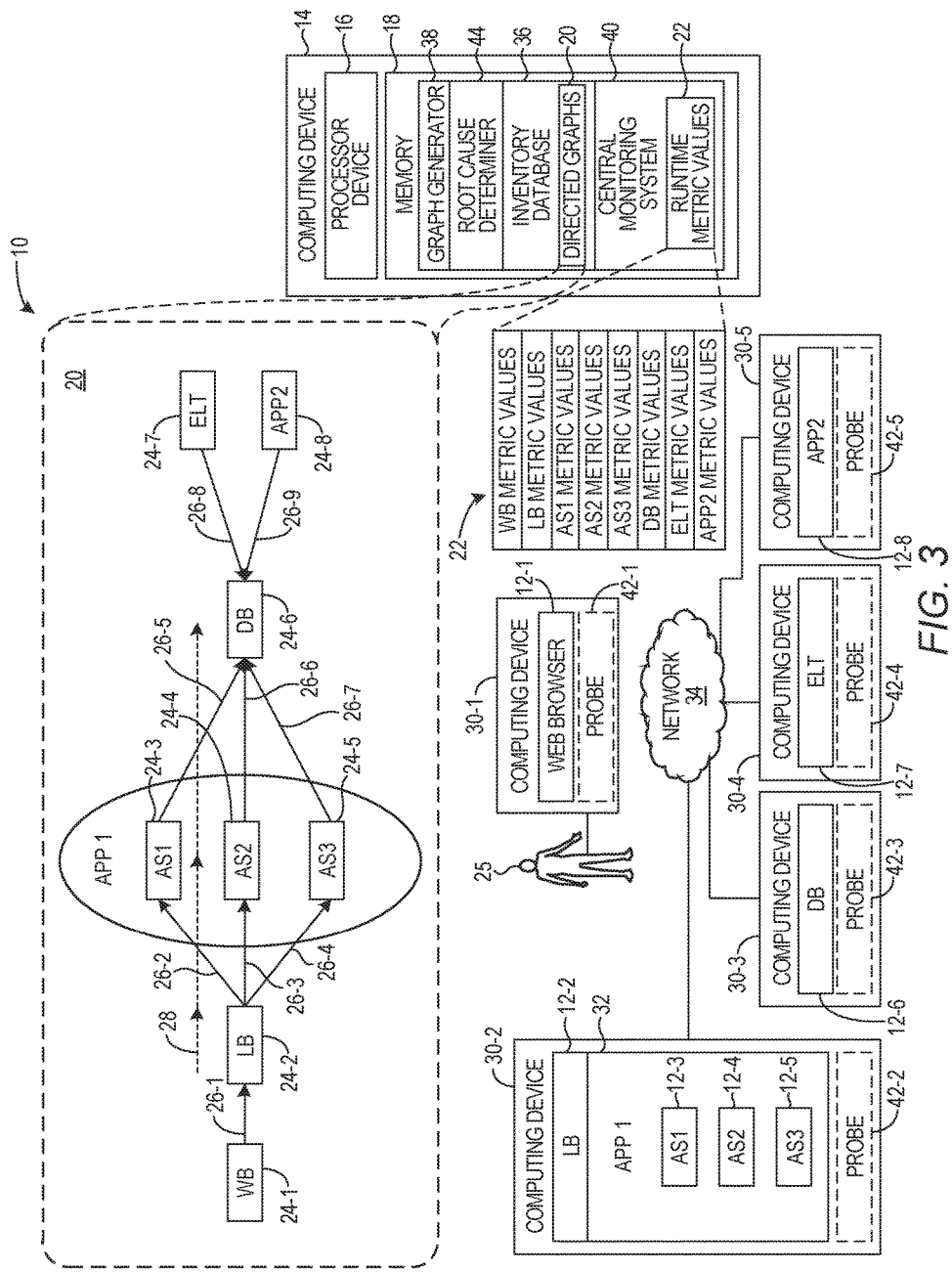
FIG. 3 is a more detailed block diagram of the environment illustrated in FIG. 1.

FIG. 3 is a more detailed block diagram of the environment 10 illustrated in FIG. 1. In this example the process 12-1, which comprises a web browser process, executes on a computing device 30-1. The process 12-2 is a load balancer process and executes on a computing device 30-2. The processes 12-3-12-5 are application server processes that collectively compose an application 32, which also executes on the computing device 30-2. The process 12-6, which comprises a database process, executes on a computing device 30-3. The process 12-7, which comprises an extract, load, and transform process, executes on a computing device 30-4. The process 12-8, which comprises an application, executes on a computing device 30-5. The computing device 14 and 30-1-30-5 may all communicate with one another via one or more networks 34.

The processes 12-1-12-8 have interrelationships in terms of dependencies with one another. Dependencies are identified in terms of a forward dependency or a reverse dependency. A first process has a forward dependency with a second process if the first process depends on the second process. For example, the first process has a forward dependency with a second process if the first process relies on the second process to function. A first process has a reverse dependency with a second process if the first process is depended on by the second process. In the directed graph 20, the vertices 24-1-24-8 correspond to the processes 12-1-12-8. The dependencies between the processes 12-1-12-8 are identified in the directed graph 20 via edges 26-1-26-9 that extend between two vertices 24 that correspond to two processes 12. For example, the vertices 24-1 and 24-2 correspond to the processes 12-1 and 12-2 respectively. The edge 26-1 points from the vertex 24-1 to the vertex 24-2 indicating that there is a forward dependency from the process 12-1-12-2. Thus, the edge 26-1 indicates that the process 12-1 depends on the process 12-2 to function. Edges 26-2-26-4 identify forward dependencies from the process 12-2 to the processes 12-3-12-5, respectively. Edges 26-5-26-7 identify forward dependencies from the processes 12-3-12-5 to the process 12-6. Edge 26-8 identifies a reverse dependency from the process 12-6 to the process 12-7. Thus, process 12-7 depends on the process 12-6 to function. Edge 26-9 identifies a reverse dependency from the process 12-6 to the process 12-8. Thus, process 12-8 depends on process 12-6 to function.

The directed graph 20 may be stored in an inventory database 36. While for purposes of illustration only eight processes 12 and one directed graph 20 are illustrated in the environment 10, in practice, the environment 10 may comprise hundreds or thousands of processes 12 and tens, hundreds or thousands of directed graphs 20 which may be stored in the inventory database 36.

The directed graph 20 may be generated in any number of ways. In one example, an operator (not illustrated) may generate the directed graph 20 and store the directed graph 20 in the inventory database 36 based on knowledge about the processes 12-1-12-8. In another example, a graph generator 38 may analyze aspects of the environment 10 and, based on the analysis, automatically generate the directed graph 20. For example, the graph generator 38 may monitor the database process 12-6 for incoming connections from other processes, and detect such incoming connections from processes 12-3-12-5, 12-7 and 12-8 and identify reverse dependencies from the process 12-6 to the processes 12-3-12-5, 12-7 and 12-8. In the case of Java processes, the graph generator 38 may analyze configuration files and/or class files to look for statements that refer to a database process. The graph generator 38 can determine which processes 12 utilize a load balancer, such as the load balancer process 12-2, and identify forward dependencies from the load balancer process 12-2 to such other processes 12. The graph generator 38 may query the computing devices 30-1-30-5 with commands to obtain information about the processes 12 that execute on the computing devices 30-1-30-5. In some examples, the graph generator 38 may query inventory providers, such as Kubernetes, and/or OpenStack, to determine which processes 12 are executing.

A central monitoring system 40 may facilitate the collection of the runtime metric values 22. In one example, the central monitoring system 40 may iteratively receive runtime metric values associated with the plurality of processes 12 from a plurality of probes 42-1-42-5 (generally, probes 42) that execute on the computing devices 30. Each probe 42 may periodically, such as each second, each predetermined fraction of a second, or at some other predetermined period of time, obtain runtime metric values 22 for various runtime metrics of the processes 12 executing on the respective computing devices 30, and send such information to the central monitoring system 40. The central monitoring system 40 receives the runtime metric values 22 and stores the runtime metric values in conjunction with a process identifier that identifies the processes 12 with which the runtime metric values 22 are associated, and a timestamp that associates a time with the runtime metric values 22. Each probe 42 may also send, on a periodic basis, runtime metric values 22 that include logfile information and/or stack trace information associated with the respective processes 12.

In another example, the central monitoring system 40 periodically sends the computing devices 30 requests for runtime metric values 22. The central monitoring system 40 may send such requests each second, each predetermined fraction of a second, or at some other predetermined period of time. In response to the request, each computing device 30 obtains the runtime metric values 22 associated with the processes 12 executing on the particular computing device 30 and sends such information to the central monitoring system 40.

The runtime metrics may comprise any suitable metrics, such as, by way of non-limiting example, any one or more of aggregate central processing unit (CPU) utilization of a respective process 12, instantaneous CPU utilization of a respective process 12, memory utilization of a respective process 12, reads of a respective process 12, writes of a respective process 12, page faults associated with a respective process 12, response latency of a respective process 12, and thread count of a respective process 12. Each probe 42 may also send, on a periodic basis, runtime metric values 22 that include logfile information and/or stack trace information associated with the respective processes 12.

The computing device 14 may also include a root cause determiner 44 that, as will be described in greater detail with regard to FIG. 4, identifies one or more root cause candidates for a problem encountered by a process 12 based on the directed graph 20 and the runtime metric values 22. The root cause determiner 44 is a digitally implemented function which may comprise hardware, software, or a combination of both. In some examples, the root cause determiner 44 comprises circuitry configured to implement the functionality described herein. In another example, the root cause determiner 44 comprises executable instructions instantiated in the memory 18 executed in conjunction with the processor device 16. In such latter example, the executable instructions cause the processor device 16 to function in a manner that is different from how the processor device 16 would function in the absence of the executable instructions. Thus, the root cause determiner 44 improves the functionality of the computing device 14. For purposes of illustration, because the root cause determiner 44 is a component of the computing device 14, functionality implemented by the root cause determiner 44 may be attributed to the computing device 14 generally. Moreover, in examples where the root cause determiner 44 comprises executable instructions that program the processor device 16 to carry out functionality discussed herein, functionality implemented by the root cause determiner 44 may be attributed herein to the processor device 16.

Figure 4:
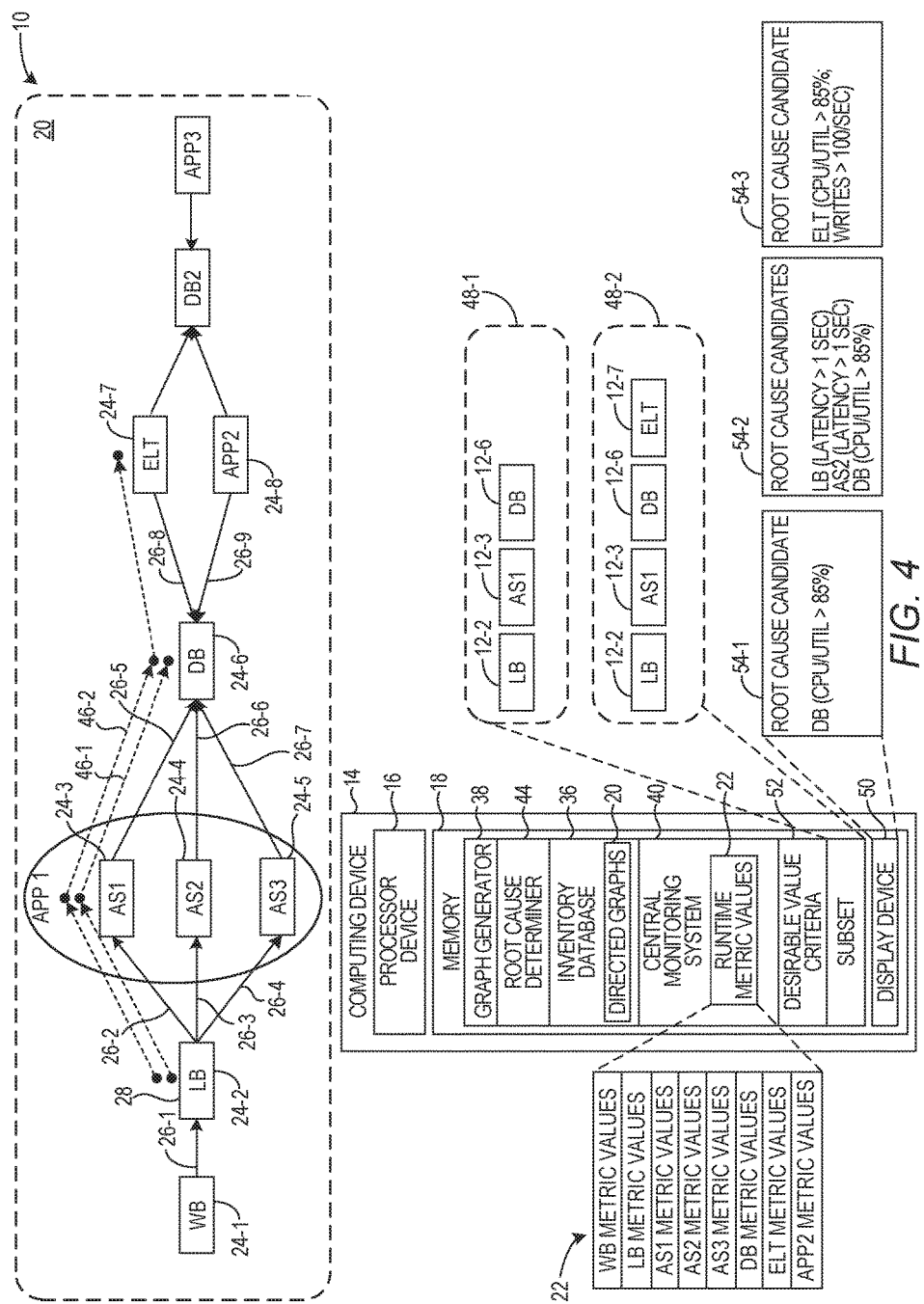
FIG. 4 is a block diagram of the environment illustrated in FIG. 3 with certain elements omitted.

FIG. 4 is a block diagram of the environment 10 illustrated in FIG. 3 with certain elements omitted to facilitate a discussion of the root cause determiner 44 according to various examples. Initially, a process 12 is determined to have encountered a problem at a particular time. In one example, this determination may be made automatically by analyzing events that have occurred, such as the termination of a process 12. In another example, an operator may enter user input into the computing device 14 that identifies a process 12 as having encountered a problem, such as unacceptable responsiveness, or the like.

In response to the determination that a process 12 has encountered a problem, the root cause determiner 44 accesses the directed graph 20. If the inventory database 36 contains multiple directed graphs 20, the root cause determiner 44 identifies the directed graph 20 that contains the process 12 that encountered the problem. Based on the directed graph 20 and the particular process 12 that encountered the problem, the root cause determiner 44 determines a path through the directed graph 20 from a start vertex 24 to an end vertex 24 to identify a subset of the processes 12 that correspond to the vertices 24 in the path.

For purposes of illustrating the determination of a path through the directed graph 20 from a start vertex 24 to an end vertex 24, assume the following scenario. The process 12-7 begins to store, in rapid succession over a period of time, a large number of records into the process 12-6 (i.e., a database system). The process 12-6, for each record, must update one or more indexes and perform other processing and cannot process each record received from the process 12-7 instantaneously, and thus begins to get bogged down. The process 12-6 also cannot respond timely to other requests from other processes 12 during this period of time because of the large number of incoming records from the process 12-7. The process 12-1 is a web browser front end that requests services from the application 32. The process 12-2 is a load balancer which balances the load of requests to the application 32 by distributing the requests over the processes 12-3-12-5. The processes 12-3-12-5 query the process 12-6 to service the request from the process 12-1. Because the process 12-6 cannot timely respond to such requests, one or more of the processes 12-3-12-5 have latency/responsiveness issues. Similarly, the process 12-2 has latency/responsiveness issues because the process 12-2 is not receiving responses in a timely manner from one or more of the processes 12-3-12-5. The process 12-1 also cannot respond to the user 25 in a timely manner, prompting the user 25 to call an operator in the environment 10. The operator enters input to the root cause determiner 44, such as via a user interface (not illustrated), that identifies the process 12-1 as having encountered a problem.

The root cause determiner 44 identifies a first vertex 24 that corresponds to the process 12-1 that encountered the problem, which, in this example, is the vertex 24-1. The root cause determiner 44 then identifies the start vertex 24 as a vertex 24 with which the first vertex 24-1 has a direct forward dependency. In this example, this is the vertex 24-2 since the first vertex 24-1 has a forward dependency with the vertex 24-2.

The root cause determiner 44 then identifies a path 46-1 of successive forward dependencies from the start vertex 24-2 through any intermediate vertices 24 to an end vertex 24 at which the forward dependencies end. Thus, in this example, the root cause determiner 44 does not include the vertex 24-1 that corresponds to the process 12-1 that encountered the problem in the path 46-1. Note also that in this example, the root cause determiner 44 may identify multiple paths, and the process discussed herein may be repeated for each such path. This is because the vertex 24-2 has three forward dependencies, one with each of vertex 24-3, 24-4 and 24-5. Assume that the root cause determiner 44 initially identifies the vertex 24-3 as the next vertex 24 in the path with a forward dependency. The vertex 24-3 has a forward dependency with the vertex 24-6, and thus the vertex 24-6 is added to the path 46-1. The vertex 24-6 does not have any additional forward dependencies and thus is the end vertex 24, and the path 46-1 stops. In this example, the path 46-1 thus includes the vertices 24-2, 24-3 and 24-6.

Based on the path 46-1, the root cause determiner 44 identifies a subset 48-1 of processes 12-2, 12-3, and 12-6, because the processes 12-2, 12-3, and 12-6 correspond to the vertices 24-2, 24-3 and 24-6 in the determined path 46-1. The root cause determiner 44 accesses the runtime metric values 22 that correspond to the processes 12-2, 12-3, and 12-6 to determine whether a runtime metric value is a non-desired value for at least one of the processes 12 in the subset 48-1 of processes 12-2, 12-3, and 12-6. In one example, the root cause determiner 44 accesses desirable value criteria 52 that correspond to particular runtime metrics to determine whether a runtime metric value is a non-desired value. The desirable value criteria 52 identify, for each runtime metric, desirable and undesirable values. The criteria may comprise for example, a range of values, or a threshold value. For example, for a CPU utilization runtime metric, the desirable value criteria 52 may indicate that a CPU utilization runtime metric value that is over 80% utilization for more than five seconds is an undesirable value. For a latency runtime metric, the desirable value criteria 52 may indicate a latency longer than 300 milliseconds is an undesirable value. Runtime metric values 22 may also include status information contained in logfile information and/or stack trace information, such as error or warning messages.

The root cause determiner 44 then identifies one or more processes 12 in the subset 48-1 of processes 12-2, 12-3, and 12-6 as a root cause candidate of the problem encountered by the process 12-1. The root cause determiner 44, in one example, identifies the process 12 that corresponds to the vertex 24 farthest in the path 46-1 from the start vertex 24-2 that has a runtime metric value that is a non-desired value as the root cause candidate. For example, assume for purposes of discussion that the process 12-2 has a latency greater than 1 second which is an undesirable value based on the desirable value criteria 52, the process 12-3 has a latency greater than 1 second which is an undesirable value based on the desirable value criteria 52, and the process 12-6 has a CPU utilization greater than 85% which is an undesirable value based on the desirable value criteria 52. In this example, the root cause determiner 44 may present a user interface 54-1 on the display device 50 that identifies the process 12-6 as the root cause candidate because the process 12-6 is the process 12 that corresponds to the vertex 24 farthest in the path 46-1 from the start vertex 24-2 that has a runtime metric value that is a non-desired value. Because the path 46-1 stopped at the end of the chain of forward dependencies, the process 12-7 was not identified as the root cause candidate of the problem encountered by the process 12-1. However, identifying the process 12-6 as the root cause candidate provides the operator with information that may facilitate the operator's subsequent identification of the cause of the problem. Moreover, in some examples, the root cause determiner 44 may also present on the display device 50 an image that depicts the directed graph 20, and that identifies the processes 12 that correspond to the vertices 24 of the directed graph 20 and the forward and reverse dependencies between such processes 12, via arrows or the like. This may be useful to the operator to further analyze a root cause of the problem encountered by the process 12-1 if necessary.

In another example, the root cause determiner 44 identifies each process 12 that corresponds to a vertex 24 in the path 46-1 that has a runtime metric value that is a non-desired value as a root cause candidate. Given the example above, the root cause determiner 44 may present a user interface 54-2 on the display device 50 that identifies each of the processes 12-2, 12-3, and 12-6 as root cause candidates because each of the processes 12-2, 12-3, and 12-6 has a runtime metric value that is a non-desired value.

In another example, the root cause determiner 44 determines a path 46-2 through the directed graph 20 from a start vertex 24 to an end vertex 24 to identify a subset of the processes 12 that correspond to vertices 24 in the path. In this example, the root cause determiner 44 includes, in the path 46-2, one vertex 24 that has a reverse dependency with the last vertex 24 in a chain of successive forward dependencies. In this example, the root cause determiner 44 identifies a first vertex 24 that corresponds to the process 12-1 that encountered the problem, which, in this example, is the vertex 24-1. The root cause determiner 44 then identifies the start vertex 24 as a vertex 24 with which the first vertex 24-1 has a direct forward dependency. In this example, this is the vertex 24-2 since the first vertex 24-1 has a forward dependency with the vertex 24-2.

The root cause determiner 44 then identifies a path 46-2 of successive forward dependencies from the start vertex 24-2 through any intermediate vertices 24 to an end vertex 24. Note, as discussed above with regard to the path 46-1, the root cause determiner 44 may identify multiple paths, and the process discussed herein may be repeated for each such path. This is because the vertex 24-2 has three forward dependencies, one with each of vertex 24-3, 24-4, and 24-5. Assume that the root cause determiner 44 initially identifies the vertex 24-3 as the next vertex 24 in the path with a forward dependency. The vertex 24-3 has a forward dependency with the vertex 24-6, and thus the vertex 24-6 is added to the path 46-2. The vertex 24-6 does not have any additional forward dependencies, however the vertex 24-6 has a reverse dependency with the vertex 24-7 and with the vertex 24-8. In this example, the root cause determiner 44 adds the vertex 24-7 to the path 46-2 and stops, and thus the vertex 24-7 is the end vertex 24. In this example, the path 46-2 includes the vertices 24-2, 24-3, 24-6 and 24-7.

Based on the path 46-2, the root cause determiner 44 identifies a subset 48-2 of processes 12-2, 12-3, 12-6, and 12-7 because the processes 12-2, 12-3, 12-6, and 12-7 correspond to the vertices 24-2, 24-3, 24-6 and 24-7 in the determined path 46-2. Similar to the discussion above with regard to the path 46-1, the root cause determiner 44 accesses the runtime metric values 22 that correspond to the processes 12-2, 12-3, 12-6, and 12-7 to determine whether a runtime metric value is a non-desired value for at least one of the processes in the subset 48-2 of processes 12-2, 12-3, 12-6, and 12-7. In this example, assume that the root cause determiner 44 identifies the process 12 that corresponds to the vertex 24 farthest in the path 46-2 from the start vertex 24-2 that has a runtime metric value that is a non-desired value as the root cause candidate. Further assume that the process 12-7 has two runtime metric values, CPU utilization, and a number of writes per second, which are undesirable values. In this example, the root cause determiner 44 may present a user interface 54-3 on the display device 50 that identifies the process 12-7 as the root cause candidate because the process 12-7 is the process 12 that corresponds to the vertex 24 farthest in the path 46-2 from the start vertex 24-2 that has a runtime metric value that is a non-desired value.

In other examples, the root cause determiner 44 may include the process 12 that encountered the problem, in these examples the process 12-1, in the path 46-1, 46-2 through the directed graph 20.

Note that in this example, the root cause determiner 44 may ultimately generate three paths from the start vertex 24-2 to vertex 24-6. Specifically, the root cause determiner 44 may determine a first path that includes the vertices 24-2, 24-3 and 24-6, a second path that includes the vertices 24-2, 24-4 and 24-6, and a third path that includes the vertices 24-2, 24-5 and 24-6. This is because the load balancer process 12-2 distributes requests among the three processes 12-3-12-5. If the root cause determiner 44 identifies the last process 12 in the path that has a runtime metric value that is an undesirable value, then in these examples, all three of the paths would result in the identification of the process 12-6 as the root cause candidate. However, in some examples, the root cause determiner 44 may analyze each path and select the path that has the greatest number of processes 12 that have runtime metric values that are undesirable.

In some examples, the root cause determiner 44 analyzes the runtime metric values of the processes 12 for a predetermined period of time prior to the first point in time. This may prevent the root cause determiner 44 from identifying a process 12 as a root cause candidate based on runtime metric values that are unrelated to the problem encountered by the process 12-1. The predetermined period of time can be any suitable time period, such as, by way of non-limiting example, in a range between one second and three minutes.

Figure 5:
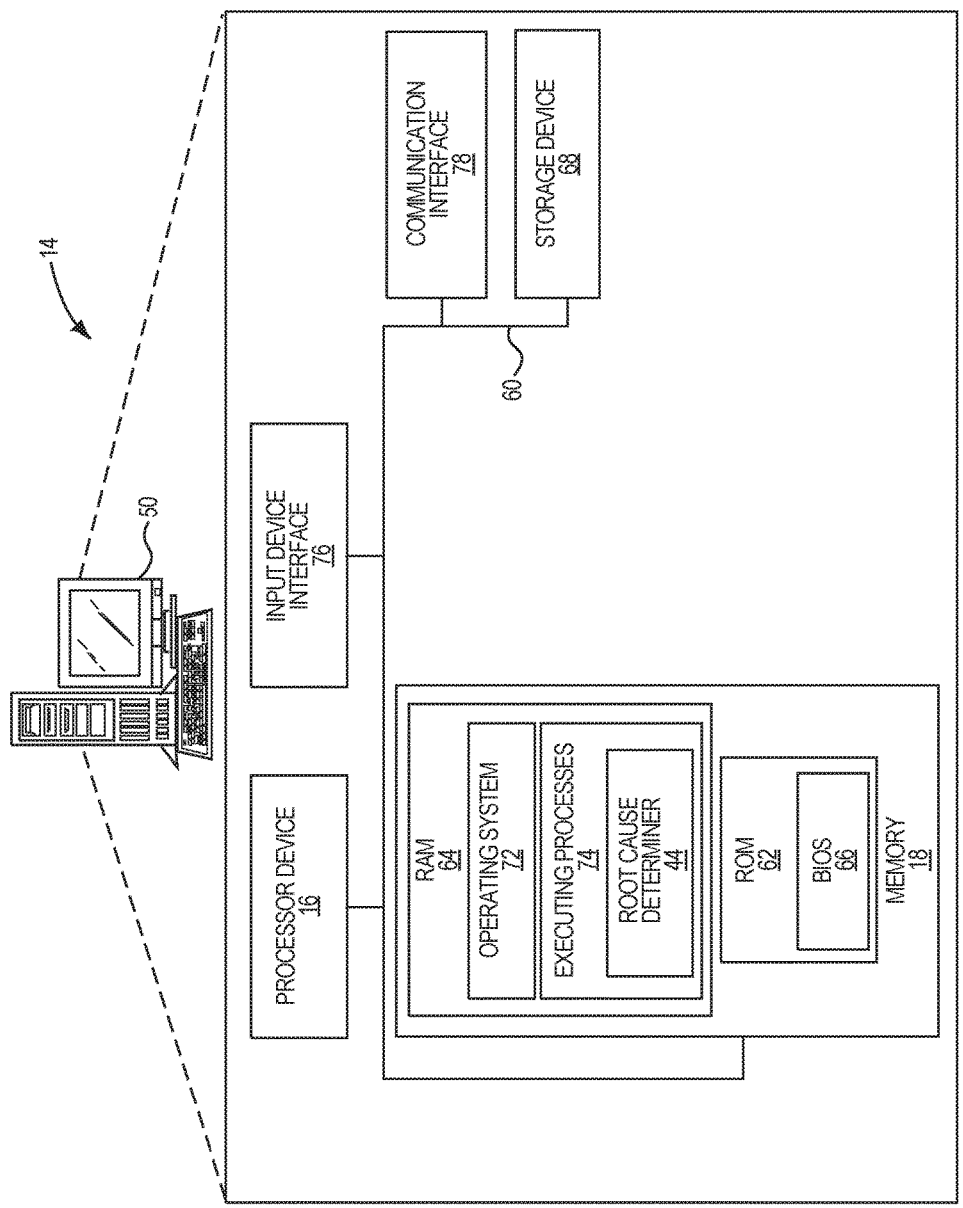
FIG. 5 is a block diagram of a computing device according to one example.

FIG. 5 is a block diagram of the computing device 14 suitable for implementing examples according to one example. The computing device 14 may comprise any computing or electronic device capable of including firmware, hardware, and/or executing software instructions to implement the functionality described herein, such as a computer server, a desktop computing device, or the like. The computing device 14 includes the processor device 16, the system memory 18, and a system bus 60. The system bus 60 provides an interface for system components including, but not limited to, the system memory 18 and the processor device 16. The processor device 16 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The system memory 18 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the computing device 14. The volatile memory 64 may also include a high-speed RAM, such as static RAM, for caching data.

The computing device 14 may further include or be coupled to a non-transitory computer-readable storage medium such as a storage device 68, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 68 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and further, that any such media may contain computer-executable instructions for performing novel methods of the disclosed examples.

A number of computer program products comprising executable instructions can be stored in the storage device 68. Corresponding executing processes may be implemented in the volatile memory 64, including an operating system 72 and one or more executing processes 74, such as the root cause determiner 44, which may implement the functionality described herein in whole or in part. It is to be appreciated that the examples can be implemented with various commercially available operating systems 72 or combinations of operating systems 72.

A number of computer program products can be stored in the storage device 68 and in the volatile memory 64, including, by way of non-limiting example, the root cause determiner 44. All or a portion of the examples may be implemented as a computer program product stored on a transitory or non-transitory computer-usable or computer-readable storage medium, such as the storage device 68, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the root cause determiner 44 in the volatile memory 64, may serve as a controller, or control system, for the computing device 14 that is to implement the functionality described herein.

An operator may also be able to enter one or more configuration commands through a keyboard (not illustrated), a pointing device such as a mouse (not illustrated), or a touch-sensitive surface such as the display device 50. Such input devices may be connected to the processor device 16 through an input device interface 76 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like.

The computing device 14 may also include a communication interface 78 suitable for communicating with the network 34 as appropriate or desired.

Among other advantages, the examples facilitate automatic and rapid identification of potential root cause candidates of problems encountered by problems in a multiple process system.

Individuals will recognize improvements and modifications to the preferred examples of the disclosure. All such improvements and modifications are considered within the scope of the concepts disclosed herein and the claims that follow.

What is claimed is:

1. A method for identifying a process as a root cause candidate of a problem, comprising:
   determining, by a computing device comprising a processing device, that a first process encountered a problem at a first point in time;
   accessing, by the computing device, a directed graph that represents each process of a plurality of processes, including the first process, as a corresponding vertex of a plurality of vertices in the directed graph, each respective vertex connected to at least one other vertex by an edge identifying at least one of a forward dependency and a reverse dependency between the respective vertex and the at least one other vertex based on corresponding dependencies between the processes that correspond to the respective vertex and the at least one other vertex;
   determining a path through the directed graph from a start vertex to an end vertex to identify a subset of processes that correspond to vertices in the path by:
      identifying a path of successive forward dependencies from the start vertex corresponding to the first process through any intermediate vertices to the end vertex at which the forward dependencies end;
      determining that the end vertex has a reverse dependency with at least one additional vertex;
      adding the at least one additional vertex to the path; and
      identifying each process that corresponds to a vertex in the path as a member of the subset of processes;
   subsequent to identifying the subset of processes, accessing corresponding runtime metric values to determine whether a runtime metric value is a non-desired value for at least one of the processes in the subset of processes; and
   identifying a process in the subset of processes as a root cause candidate of the problem encountered by the first process based on at least one of the corresponding runtime metric values.

2. The method of claim 1 comprising:
   iteratively receiving, over a period of time, runtime metric values associated with the plurality of processes, the runtime metric values identifying one or more of aggregate central processing unit (CPU) utilization of a respective process, instantaneous CPU utilization of the respective process, memory utilization of the respective process, reads of the respective process, writes of the respective process, page faults associated with the respective process, response latency of the respective process, and thread count of the respective process; and
   storing the runtime metric values in conjunction with a process identifier that identifies the process and a timestamp that associates a time with the runtime metric values.

3. The method of claim 2 wherein the iteratively receiving step further comprises iteratively receiving, over the period of time, the runtime metric values associated with the plurality of processes from a plurality of probes.

4. The method of claim 2 wherein the iteratively receiving step further comprises iteratively receiving, over the period of time, the runtime metric values associated with the plurality of processes in response to sending, over the period of time, a plurality of requests for the runtime metric values.

5. The method of claim 1 wherein determining that the first process encountered the problem at the first point in time comprises accessing information that identifies an event associated with the first process that indicates that the first process encountered the problem.

6. The method of claim 1 wherein determining that the first process encountered the problem at the first point in time comprises receiving user input that identifies the first process as having encountered the problem at the first point in time.

7. The method of claim 1 wherein identifying the process in the subset of processes as the root cause candidate of the problem encountered by the first process comprises identifying the process that corresponds to the vertex farthest in the path from the start vertex and that has the runtime metric value that is the non-desired value as the root cause candidate.

8. The method of claim 1 wherein identifying the process in the subset of processes as the root cause candidate of the problem encountered by the first process comprises identifying each process that corresponds to a vertex in the path that has the runtime metric value that is the non-desired value as the root cause candidate.

9. The method of claim 1 wherein accessing the corresponding runtime metric values to determine whether the runtime metric value is the non-desired value for the at least one of the processes in the subset of processes further comprises accessing the corresponding runtime metric values obtained within a predetermined period of time prior to the first point in time.

10. The method of claim 9 wherein the predetermined period of time is in a range between one second and three minutes.

11. The method of claim 1 wherein the directed graph comprises at least four vertices.

12. A computing device comprising:
a memory;
a processor device coupled to the memory to:
    determine that a first process encountered a problem at a first point in time;
    access a directed graph that represents each process of a plurality of processes, including the first process, as a corresponding vertex of a plurality of vertices in the directed graph, each respective vertex connected to at least one other vertex by an edge identifying at least one of a forward dependency and a reverse dependency between the respective vertex and the at least one other vertex based on corresponding dependencies between the processes that correspond to the respective vertex and the at least one other vertex;
    determine a path through the directed graph from a start vertex to an end vertex to identify a subset of processes that correspond to vertices in the path by:
        identifying a first vertex corresponding to the first process;
        identifying the start vertex as a vertex with which the first vertex has a direct forward dependency;
        identifying a path of successive forward dependencies from the start vertex through any intermediate vertices to the end vertex at which the forward dependencies end;
        determining that the end vertex has a reverse dependency with at least one additional vertex;
        adding the at least one additional vertex to the path; and
        identifying each process that corresponds to a vertex in the path as a member of the subset of processes;
    subsequent to identifying the subset of processes, access corresponding runtime metric values to determine whether a runtime metric value is a non-desired value for at least one of the processes in the subset of processes; and
    identify a process in the subset of processes as a root cause candidate of the problem encountered by the first process based on at least one of the corresponding runtime metric values.

13. A computer program product for identifying a process as a root cause candidate of a problem, the computer program product stored on a non-transitory computer-readable storage medium and including instructions configured to cause a processor device to:
    determine that a first process encountered a problem at a first point in time;
    access a directed graph that represents each process of a plurality of processes, including the first process, as a corresponding vertex of a plurality of vertices in the directed graph, each respective vertex connected to at least one other vertex by an edge identifying at least one of a forward dependency and a reverse dependency between the respective vertex and the at least one other vertex based on corresponding dependencies between the processes that correspond to the respective vertex and the at least one other vertex;
    determine a path through the directed graph from a start vertex to an end vertex to identify a subset of processes that correspond to vertices in the path by:
        identifying a path of successive forward dependencies from the start vertex corresponding to the first process through any intermediate vertices to the end vertex at which the forward dependencies end;
        determining that the end vertex has a reverse dependency with at least one additional vertex;
        adding the at least one additional vertex to the path; and
        identifying each process that corresponds to a vertex in the path as a member of the subset of processes;
    subsequent to identifying the subset of processes, access corresponding runtime metric values to determine whether a runtime metric value is a non-desired value for at least one of the processes in the subset of processes; and
    identify a process in the subset of processes as a root cause candidate of the problem encountered by the first process based on at least one of the corresponding runtime metric values.

14. A method for identifying a process as a root cause candidate of a problem, comprising:
    determining, by a computing device comprising a processing device, that a first process encountered a problem at a first point in time;
    accessing, by the computing device, a directed graph that represents each process of a plurality of processes, including the first process, as a corresponding vertex of a plurality of vertices in the directed graph, each respective vertex connected to at least one other vertex by an edge identifying at least one of a forward dependency and a reverse dependency between the respective vertex and the at least one other vertex based on corresponding dependencies between the processes that correspond to the respective vertex and the at least one other vertex;
    determining a path through the directed graph from a start vertex to an end vertex to identify a subset of processes that correspond to vertices in the path by:
        identifying a first vertex corresponding to the first process;
        identifying the start vertex as a vertex with which the first vertex has a direct forward dependency;
        identifying a path of successive forward dependencies from the start vertex through any intermediate vertices to the end vertex at which the forward dependencies end;
        determining that the end vertex has a reverse dependency with at least one additional vertex;
        adding the at least one additional vertex to the path; and
        identifying each process that corresponds to a vertex in the path as a member of the subset of processes;
    subsequent to identifying the subset of processes, accessing corresponding runtime metric values to determine whether a runtime metric value is a non-desired value for at least one of the processes in the subset of processes; and
    identifying a process in the subset of processes as a root cause candidate of the problem encountered by the first process based on at least one of the corresponding runtime metric values.

15. A computing device comprising:
a memory;
a processor device coupled to the memory to:
    determine that a first process encountered a problem at a first point in time;

access a directed graph that represents each process of a plurality of processes, including the first process, as a corresponding vertex of a plurality of vertices in the directed graph, each respective vertex connected to at least one other vertex by an edge identifying at least one of a forward dependency and a reverse dependency between the respective vertex and the at least one other vertex based on corresponding dependencies between the processes that correspond to the respective vertex and the at least one other vertex;

determine a path through the directed graph from a start vertex to an end vertex to identify a subset of processes that correspond to vertices in the path by:
identifying a path of successive forward dependencies from the start vertex corresponding to the first process through any intermediate vertices to the end vertex at which the forward dependencies end;
determining that the end vertex has a reverse dependency with at least one additional vertex;
adding the at least one additional vertex to the path; and
identifying each process that corresponds to a vertex in the path as a member of the subset of processes;

subsequent to identifying the subset of processes, access corresponding runtime metric values to determine whether a runtime metric value is a non-desired value for at least one of the processes in the subset of processes; and identify a process in the subset of processes as a root cause candidate of the problem encountered by the first process based on at least one of the corresponding runtime metric values.

16. A computer program product for identifying a process as a root cause candidate of a problem, the computer program product stored on a non-transitory computer-readable storage medium and including instructions configured to cause a processor device to:

determine that a first process encountered a problem at a first point in time;

access a directed graph that represents each process of a plurality of processes, including the first process, as a corresponding vertex of a plurality of vertices in the directed graph, each respective vertex connected to at least one other vertex by an edge identifying at least one of a forward dependency and a reverse dependency between the respective vertex and the at least one other vertex based on corresponding dependencies between the processes that correspond to the respective vertex and the at least one other vertex;

determine a path through the directed graph from a start vertex to an end vertex to identify a subset of processes that correspond to vertices in the path by:
identifying a first vertex corresponding to the first process;
identifying the start vertex as a vertex with which the first vertex has a direct forward dependency;
identifying a path of successive forward dependencies from the start vertex through any intermediate vertices to the end vertex at which the forward dependencies end;
determining that the end vertex has a reverse dependency with at least one additional vertex;
adding the at least one additional vertex to the path; and
identifying each process that corresponds to a vertex in the path as a member of the subset of processes;

subsequent to identifying the subset of processes, access corresponding runtime metric values to determine whether a runtime metric value is a non-desired value for at least one of the processes in the subset of processes; and identify a process in the subset of processes as a root cause candidate of the problem encountered by the first process based on at least one of the corresponding runtime metric values.

\* \* \* \* \*